United States Patent

Goldsmith

[15] 3,674,921

[45] July 4, 1972

[54] THREE-DIMENSIONAL TELEVISION SYSTEM

[72] Inventor: Alfred Norton Goldsmith, New York, N.Y.

[73] Assignee: RCA Corporation

[22] Filed: Nov. 12, 1969

[21] Appl. No.: 875,796

Related U.S. Application Data

[63] Continuation-in-part of Ser. No. 678,710, Oct. 27, 1967, abandoned.

[52] U.S. Cl. .......................................178/5.4 R, 178/6.5 R
[51] Int. Cl. ..........................................................H04n 9/60
[58] Field of Search..................178/6.5 R, 5.4 R; 179/15 BT, 179/1.6, 1.6 P, 15.55 R

[56] References Cited

UNITED STATES PATENTS 2,455,456 12/1948 Whittaker...............................178/6.5
2,931,855 4/1960 Abramson ..............................178/6.5
3,219,759 11/1965 Dome......................................179/15

FOREIGN PATENTS OR APPLICATIONS 571,945 9/1945 Great Britain..........................178/6.5

*Primary Examiner*—Richard Murray
*Assistant Examiner*—P. M. Pecori
*Attorney*—Eugene M. Whitacre

[57] ABSTRACT

The high frequency difference between the complete respective left and right eye representative video signals is shifted to the low frequency video signal spectrum and transmitted at reduced amplitude in the vestigial sideband of the picture carrier, the complete sideband of which conveys one of the complete video signals to a receiver at which the complete video and difference signals are separately recovered, the latter being restored to its original amplitude and position in the frequency spectrum and combined with the recovered complete video signal to simulate the other complete video signal. The fully transmitted and recreated video signals are employed to produce two horizontally interleaved images on the screen of a cathode ray tube for viewing through vertical lenticulations. The difference signal may be modified before transmission to compensate for certain anomalous optical effects and/or to create a desired psychophysical effect in the picture reproduced by the cathode ray tube.

28 Claims, 26 Drawing Figures

INVENTOR.
ALFRED N. GOLDSMITH
BY Eugene M. Whitacre
Attorney

INVENTOR.
ALFRED N. GOLDSMITH
BY
Eugene M. Whitacre
Attorney

INVENTOR.
ALFRED N. GOLDSMITH
BY
Eugene M. Whitacre
Attorney

INVENTOR.
ALFRED N. GOLDSMITH
BY Eugene M. Whitacre
Attorney

FIG. 18.
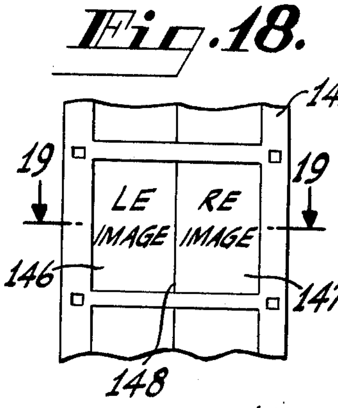
FIG. 19.
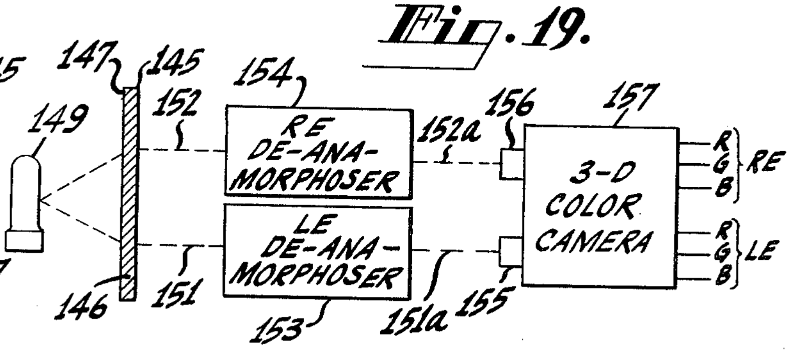
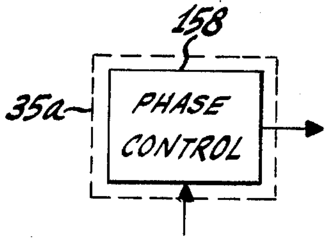
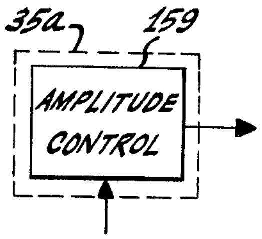
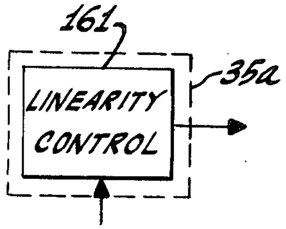
FIG. 20. FIG. 21. FIG. 22.
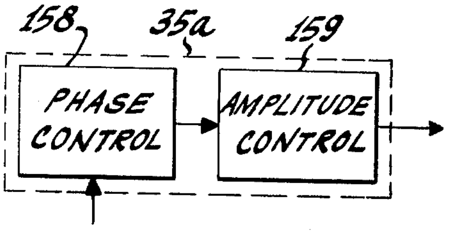
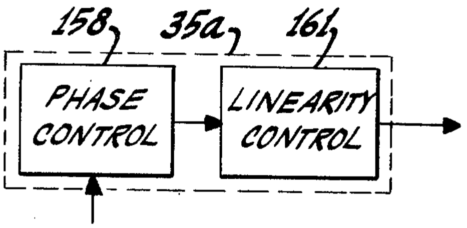
FIG. 23. FIG. 24.
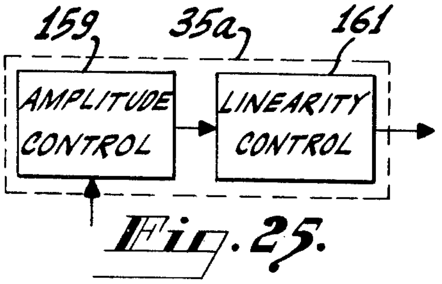
FIG. 25.
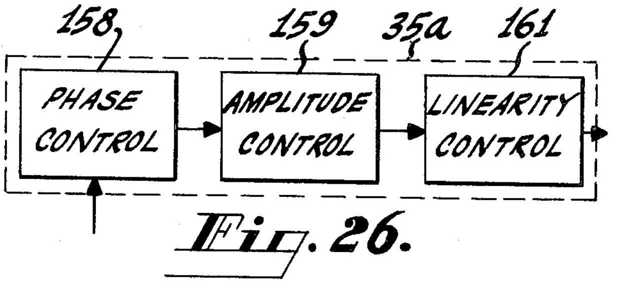
FIG. 26.
INVENTOR.
ALFRED N. GOLDSMITH
BY
Eugene M. Whitacre
Attorney

THREE-DIMENSIONAL TELEVISION SYSTEM

This invention relates to a three-dimensional television system and particularly to such a system which is compatible with the present black and white and color television systems and one in which the viewer is not required to wear special spectacles or other optical and/or mechanical viewing aids. It is a continuation-in-part of a copending application of Alfred N. Goldsmith having Ser. No. 678,710, now abandoned filed Oct. 27, 1967, and titled "THREE-DIMENSIONAL COLOR TELEVISION SYSTEM."

Many proposals previously have been made of three-dimensional television systems for both black and white as well as color image reproduction. Such systems have had one or more major deficiencies. Some have required the observer to wear glasses (e.g., using polarizing materials) or to use some other visual aid in order to secure stereoscopic effects. Among such devices are rotating, synchronized occulting shutters or filters, for example. Others have needed full-power occupancy of more than the presently assigned 6-megahertz transmission channel allotted to both picture and accompanying sound signals. Still others required especially designed receivers which were not capable of receiving the conventional monochrome and color television transmissions automatically or even with manual adjustment.

An object of the present invention is to provide a novel three-dimensional television system and apparatus which are fully compatible with present television systems, operate within (or effectively within) the presently allotted transmission channels, and require the use of no special visual aids.

In accordance with the invention, first and second video signals representing a subject as seen respectively by an observer's left and right eyes are developed. A first set of such video signals is transmitted to a receiver as developed. Instead of transmitting the complete second set of video signals, a signal representing only (but not necessarily identical with) the high frequency difference between the first and second sets of developed video signals is transmitted to the receiver. A suitable combination of the two transmitted signals is effected at the receiver to recreate (or psychologically to simulate) the second set of video signals substantially as originally developed at the transmitter. The two sets of video signals respectively representing left-eye and right-eye information are impressed upon the electron gun structure of a cathode ray tube to excite the light-producing components of the tube screen suitably to produce two horizontally interleaved images. These two images are viewed respectively by an observer's left and right eyes through vertical lenticulations provided on the faceplate of the tube in alignment respectively with each pair of components of the interleaved images.

The expedient of transmitting for use in image reproduction the complete first set of video signals and only the high frequency difference between the first and second sets of signals is based, firstly, on the substantial identity of the two sets of signals representing the large area backgrounds of the two stereoscopic views of the subject. Secondly, even though the middlegrounds and the foregrounds of the subject are graphically very similar, they differ almost entirely in their relative horizontal stereoscopic displacements and the video signals representing such areas have relatively high frequencies, the difference between which is a measure of the horizontal stereoscopic displacements.

In the novel three-dimensional television system in accordance with the present invention, as in general in all other such systems, however, there are certain anomalous effects which may tend to detract from the desired stereoscopic reproduction of a subject. The three principle ones of such effects that would produce the greatest undesired detractions are referred to herein as "zone flattening," "giantism" and "-puppetry."

Zone flattening results when a number of objects, or parts of a large and deep object, are at moderate but slightly different distances respectively from the camera so that there is a tendency for the adjacent or nearby planes of such an object to coalesce seemingly into a single plane even though they are at different optic-axial distances from the camera.

Psychologically, zone flattening reduces the apparent thickness of an object, thereby effectively diminishing its solidity or three-dimensionality. Thus, the desired stereoscopic effects are reduced, thereby detracting from any reproduction of the object made from signals produced by the camera.

Giantism results when the optic-axial distance between the camera and a solid object is made small, such as when a tight close-up view of the object is desired. In such a case, the thickness or depth of the object may appear to the camera as greater than it actually is so that any reproduction of the object from signals generated by the camera will have an unnatural or giant appearance. The effect of giantism in a reproduced close-up of a human face is particularly objectionable because of its unnatural, even grotesque, appearance.

Puppetry results when one or more medium-sized or small objects (such as miniature models, for example) are located at a short distance from the camera. In some cases it has been found that the perspective distortions causing unnatural effects may occur in reproductions made from signals derived from the camera. For example, such miniaturization may give a "doll-like" appearance to a human face.

Another object of the invention, therefore, is to provide video signal modifying means by which to control such anomalous effects as zone-flattening, giantism and puppetry in a novel three-dimensional television system of the character described generally heretofore and in detail subsequently.

In accordance with that aspect of the invention pertaining to the video signal modification by which the anomalous effects may be compensated, the high frequency difference between the first and second sets of video signals is subjected to any single one or any combination of means for adjusting its phase, amplitude and linearization (or non-linearization).

A better understanding of the invention may be derived from the following description which is given with reference to the accompanying drawings, of which:

FIG. 18 illustrates a subject in the form of a novel two-dimensional record for use in a system embodying the invention;

FIG. 19 is a graphical representation of a modified portion of the transmitter of FIG. 1 for use with a subject such as that shown in FIG. 18;

FIG. 20 is a form of a difference signal modifier of FIG. 1 comprising a signal phase control;

FIG. 21 is a form of a difference signal modifier of FIG. 1 comprising a signal amplitude control;

FIG. 22 is a form of a difference signal modifier of FIG. 1 comprising a signal linearity control;

FIG. 23 is a form of a difference signal modifier of FIG. 1 comprising the combination of a signal phase control and a signal amplitude control;

FIG. 24 is a form of a difference signal modifier of FIG. 1 comprising the combination of a signal phase control and a signal linearity control;

FIG. 25 is a form of a difference signal modifier of FIG. 1 comprising the combination of a signal amplitude control and a signal linearity control; and FIG. 26 is a form of a difference signal modifier of FIG. 1 comprising the combination of a signal phase control, a signal amplitude control and a signal linearity control.

Figures 1, 2:
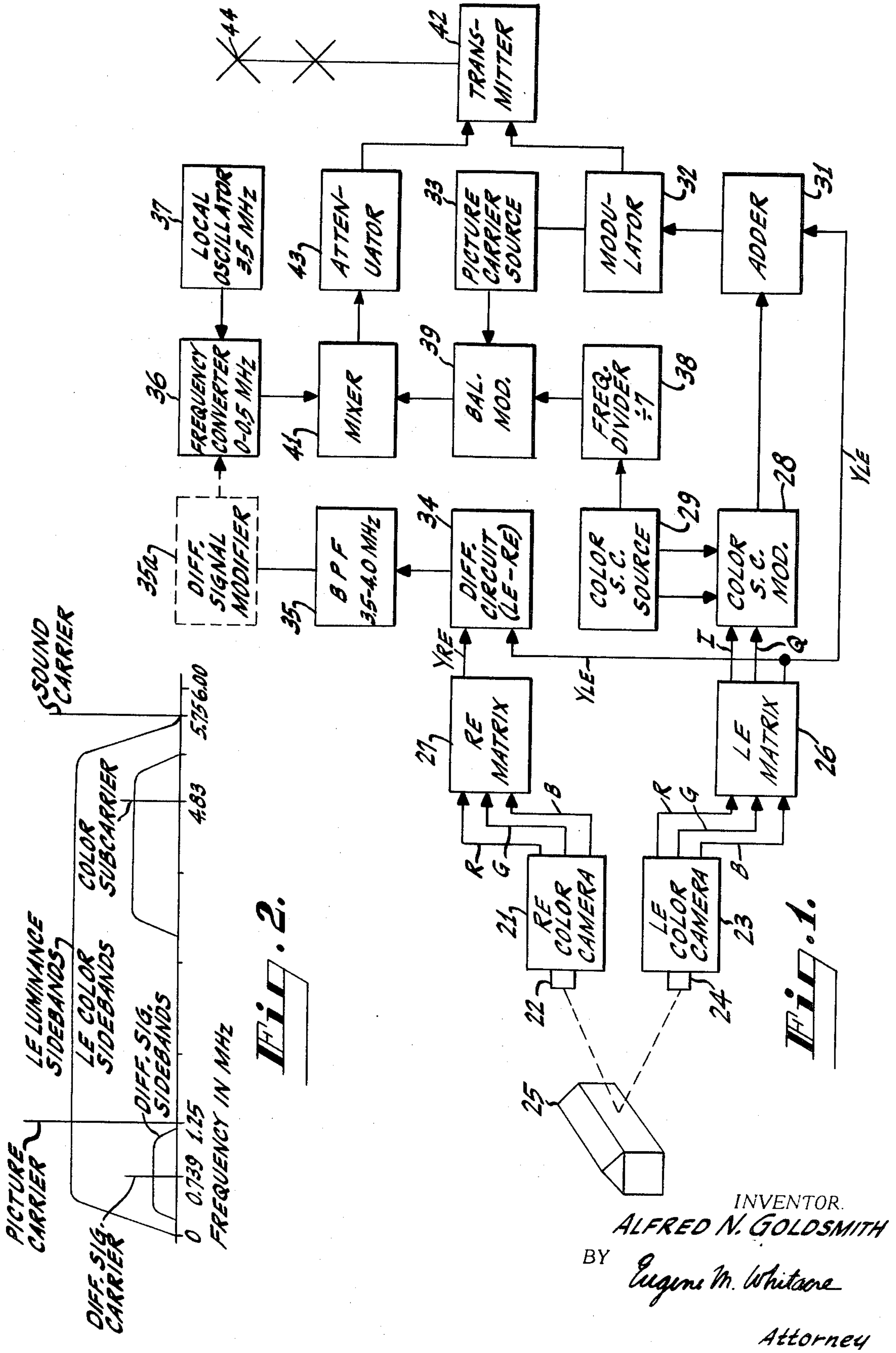
FIG. 1 is a block diagram of the general form of transmitter embodying the invention.
FIG. 2 is a representation of the frequency spectrum of a standard 6-megahertz television channel indicating one manner in which the left and right eye difference signal may be transmitted.

The transmitter of FIG. 1 includes a right-eye color camera 21 having an optical system 22 and a left-eye color camera 23 having an optical system 24. The two cameras may be separate from one another or they may be combined in a single unit, if desired, so long as the optical systems 22 and 24 thereof, have substantially an inter-ocular spacing of approximately 2 ½ inches. If more or less than the usual stereoscopic effect is desired, conventional adjustment means can be provided whereby the optic-axial separation of the camera optical systems 22 and 24 can be made greater or less than the usual inter-ocular distance of 2 ½ inches. Also, the cameras may be of any known type and may have one or more pickup tubes. One such commonly used color television camera has three tubes, one for each of three primary image colors. Another color camera has four tubes, one for each of three colors and one for the general luminance of the subject. The present invention is useable with any type of color camera. In accordance with a feature of the invention, one of the cameras may be a black and white camera. As represented in this figure, the television subject is assumed to be a live scene including a three-dimensional object 25.

The color signals R, G and B derived from the left-eye camera 23 and representing, respectively, three component colors such as red, green and blue of the three-dimensional scene including the object 25 are impressed upon a color signal processor such as an LE matrix 26. The LE matrix 26 will be understood to transform the three component color signals R, G and B into a single set of signals representing the left-eye information LE. The character of the left-eye information signals is determined by the color television system in vogue where the three-dimensional color television system according to the present invention is used. For example, in the United States where the so-called NTSC system is established as the standard color television system, the signal LE will be understood to include a luminance component and a chrominance component in the form of an amplitude and phase modulated subcarrier wave within the video frequency range of the luminance signal. Accordingly, the LE matrix 26 produces in its output a luminance signal $Y_{LE}$ and a pair of color difference signals I and Q which are used to modulate a color subcarrier wave. In certain European countries, on the other hand, these signals may be of the form specified for the PAL system, the SECAM system, etc.

The color signals R, G and B derived from the right-eye camera 21 are impressed upon on RE matrix 27 which produces in its output a luminance signal $Y_{RE}$. It will be understood that, alternatively, a black and white camera producing a suitable luminance signal $Y_{RE}$ may be used instead of the RE color camera 21 and the RE matrix 27.

The I and Q color difference signals derived from the LE matrix 26 are applied to a color subcarrier wave modulator 28 which functions to phase and amplitude modulate a color subcarrier wave derived from a source 29. The modulated color subcarrier wave derived from the modulator 28 is combined with the left-eye luminance signal $Y_{LE}$ in an adder 31 to produce a composite signal conforming to the U.S. color television standards. Such a composite signal is impressed upon a carrier wave modulator 32 so as to amplitude modulate a picture carrier wave derived from a source 33.

The left-eye luminance signal $Y_{LE}$ and the right-eye luminance signal $Y_{RE}$ are applied to a difference circuit 34. This circuit produces an output signal which is the difference between the left-eye luminance signal $Y_{LE}$ and the right-eye luminance signal $Y_{RE}$. Such a signal may be indicated as (LE-RE). It is to be understood, however, that it is within the purview of the present invention to arrange the difference circuit 34 so as to produce a difference signal (RE-LE) if desired. It will be appreciated that, because of the normal left-to-right scanning operation by which the video signals are generated, a (LE-RE) difference signal is not necessarily the full equivalent of a (RE-LE) signal. Either type of difference signal will, however, enable the three-dimensional production of an image representative of the original subject. In the remainder of this description and in the claims, it is to be understood that references to difference signals is intended to cover either of such arrangements.

A presently preferred one of a number of available means for conveying such a difference signal to a receiver is the frequency-interlacing technique disclosed in U.S. Pat. No. 2,635,140 granted Apr. 14, 1953, to Robert B. Dome. Accordingly, the difference signal derived from the circuit 34 is applied to a bandpass filter 35 which operates to produce in its output circuit only the high frequency portion of the difference signal from 3.5 to 4.0 megahertz, for example. This high frequency band of the difference signal is applied directly, or preferably through a signal modifier 35*a* to be described later, to a frequency converter 36 to which also is applied an unmodulated wave derived from a local oscillator 37 having a frequency of approximately 3.5 megahertz. The frequency converter 36 functions to convert the 3.5 to 4.0 megahertz difference signal to a band of frequencies extending from substantially 0 to 0.5 megahertz. Following one of the teachings of the Dome patent this signal is to be modulated upon a difference signal carrier having a frequency located in the spectrum approximately at the center of the vestigial sideband of the picture carrier.

In order that the difference signal carrier be properly located relative to the picture carrier in the manner taught by Mertz and Gray in an article appearing in the Bell System Technical Journal of July, 1934, at pages 464 to 515 is substantially the same manner as the color subcarrier frequency is related to the picture carrier frequency to conform to the U. S. color television standards, the difference signal carrier wave is derived by means including a frequency divider 38, which receives the color subcarrier wave from the source 29 and a balanced modulator 39 which receives the frequency-divided color subcarrier wave and the picture carrier wave from the source 33. For a color subcarrier wave of approximately 3.579 megahertz the frequency of the wave derived from the divider 38 is approximately 0.511 megahertz. The difference signal carrier wave derived from the balanced modulator 39 has a frequency which is less than the picture carrier frequency by 0.511 megahertz. The difference signal carrier wave is applied to a mixer 41 together with the 0 to 0.5 megahertz difference signal derived from the frequency converter 36. The difference signal carrier wave and its modulation sidebands derived from the mixer 41 are impressed upon the station transmitter 42, preferably through an attenuator 43. The composite color signal derived from the modulator 32 also is impressed upon the transmitter 42 where it is combined with the modulated difference signal carrier wave for transmission by means including an antenna 44.

A reference to FIG. 2 shows the relationship of the picture carrier, the sound carrier, the color subcarrier and its sidebands, and the difference signal carrier and its sidebands in the frequency spectrum of a standard 6 megahertz channel. It is seen that, with the picture carrier located at a frequency 1.25 megahertz from the low end of the channel, the sound carrier is located 4.5 megahertz higher in the channel at the 5.75 megahertz point. It also is seen that the left-eye (LE) luminance signal sidebands extend from the zero megahertz point of the channel to a point adjacent to the sound carrier. The color subcarrier is located at the 4.83 megahertz point of the spectrum where it is seen to be spaced from the picture carrier by approximately 3.579 megahertz. Also, the difference signal carrier, being located at the 0.739 megahertz point of the channel has its sidebands spaced by approximately 0.5 megahertz therefrom, thus lying within the range of the vestigial sideband of the picture carrier. It may be advantageous to transmit the difference signal sidebands at a lower amplitude than the left-eye luminance signal sidebands and the color subcarrier sidebands, which is the purpose of the attenuator 43 of FIG. 1.

Figures 3, 4, 5:
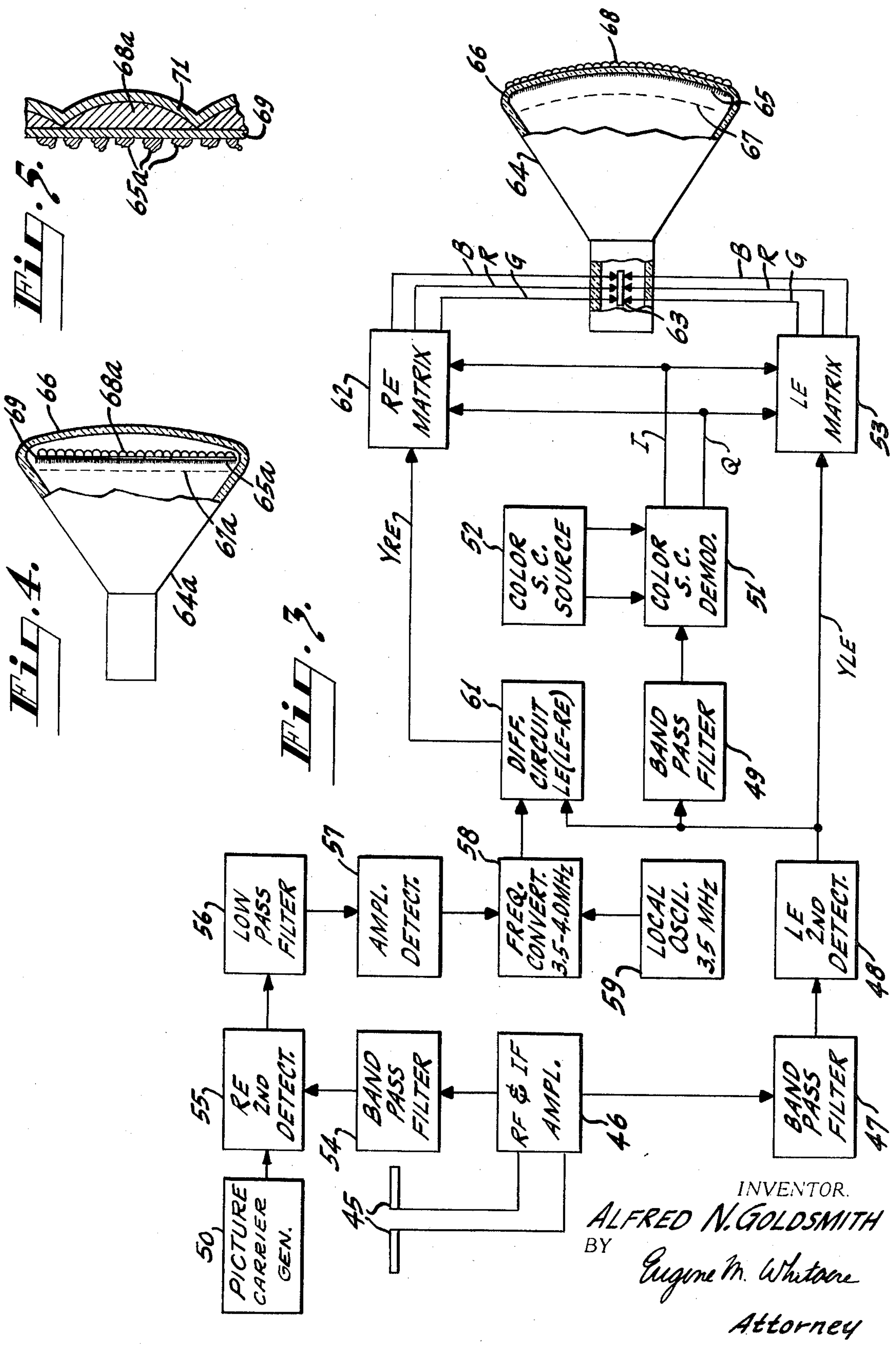
FIG. 3 is a block diagram of the general form of receiver embodying the invention.
FIG. 4 is a graphical representation of a three-dimensional color picture tube of a somewhat different form than that indicated in FIG. 3.
FIG. 5 is a greatly enlarged section of the picture tube represented in FIG. 4.

The general form of receiving apparatus for signals generated by the described transmitting apparatus is shown in FIG. 3. The receiver includes an antenna 45 which intercepts the signals radiated from the transmitter antenna 44 of FIG. 1 and applies them to the input of the receiver. The receiver includes the customary head-in apparatus for processing the received television signals and comprises such components as a radio frequency amplifier, a frequency converter and an intermediate frequency amplifier 46. Signals derived at intermediate frequency from the amplifier 46 are impressed upon a bandpass amplifier 47 which effectively passes only the luminance and chrominance signals relating to the left-eye image. In other words, the filter 47 greatly attenuates the difference signal carrier and its sidebands. The left-eye signals are impressed upon an LE second detector 48 which functions in the same manner as the second detector in a monocular color television receiver.

The detected signals derived from the second detector 48 are conveyed to a chrominance signal bandpass amplifier 49 which processes the chrominance signals in a band extending approximately from 2.0 to 4.0 megahertz and impresses such signals upon a color subcarrier demodulator 51. The demodulator is also provided with appropriate phases of the color subcarrier wave derived from a color subcarrier source 52 so as to produce in its output the I and Q color difference signals. These signals, in turn, are impressed upon an LE matrix 53 together with the left-eye luminance signal $Y_{LE}$ derived from the second detector 48. The matrix functions in the usual manner to produce in its output component color signals B, R and G representative respectively of the blue, red and green color components of the left-eye image.

The intermediate frequency signal produced in the output amplifier 46 also is impressed upon a bandpass amplifier 54 which is effective to pass substantially only the difference signal carrier with its sidebands and the main picture carrier. Such a signal is impressed upon an RE second detector 55 which effectively heterodynes the difference signal and picture carriers to produce in its output a signal which includes a 0.511 megahertz carrier modulated by the difference signal. The output from the second detector 55 is passed through a low pass filter 56 which selects the difference signal carrier and its principal sidebands. The signal thus derived from the filter 56 is applied to the amplitude detector 57 which functions to recover the difference signal which is produced in its output. This 0 to 0.5 megahertz signal is impressed upon a frequency converter 58 which also receives a 3.5 megahertz wave from a local oscillator 59. There is, thus, produced in the output of the frequency converter the difference signal in the range of 3.5 to 4.0 megahertz representing the high frequencies of the difference between the left-eye and right-eye luminance signals.

The high frequency difference signal is impressed upon a difference circuit 61 which also receives the full range of the left-eye luminance signal $Y_{LE}$. A signal representing the difference between the full frequency range of the left-eye luminance signal and the high frequency band of the right-eye luminance signal is derived from the output of the difference circuit 61, thereby reconstituting a right-eye luminance signal $Y_{RE}$ which comprises the low and intermediate frequencies of the left-eye luminance signal and the high frequencies of the right-eye luminance signal. Such a signal is impressed upon an RE matrix 62 for combination with the I and Q color difference signals derived from the color subcarrier demodulator 51 to produce B, R and G component color signals effectively simulating the blue, red and green colors of the right-eye image.

The component color signals derived respectively from the right-eye and left-eye matrices 62 and 53 are applied to the electron gun structure 63 of a three-dimensional color television image reproducing cathode ray tube 64. This tube has the same general form of the cathode ray tubes used for the production of color television images used in present day color television apparatus. It has a screen 65 of colored light producing luminescent components formed on the inner surface of the face plate 66. The screen components are excited by electron beams from the gun structure 63 through a shadow mask 67. In the present case, however, the luminescent screen components may be arranged in any one of a number of different patterns and formed into a series of vertical columns. Left-eye images are produced by one half of the vertical columns of screen components and right-eye images by the other half. The left-eye and right-eye columns are interleaved so as to group them in pairs. On the outer surface of the face plate 66, there are formed a plurality of vertical lenticulations 68, one of which is provided for each pair of left-eye and right-eye columnar screen components. Typical screen patterns and lenticular configurations will be described subsequently.

While the display tube herein described is of the well known shadow mask type, suitably modified for three-dimensional viewing, and while such tube embodiment is presently preferred for such purpose, it should be understood that the use of other types of color television display tubes may be employed in a generally similar fashion and that their use falls within the scope of this invention. Such types of tubes include, illustratively, those wherein vertical component color strips are horizontally scanned by an accurately indexed electron beam.

FIG. 4 illustrates another form of shadow mask picture tube which may be used advantageously in the practice of this invention. In the tube 64a the luminescent screen 65a is formed on the electron gun side of a thin transparent substrate 69 and the lenticulations 68a are formed on the other side of the substrate. In this way, the three-dimensional effect of viewing the columnar arrangements of the screen elements through the associated lenticulations may be enhanced as compared to the picture tube 64 of FIG. 3 in which the relatively thicker face plate 66 of the tube serves as a substrate for the screen 65 and the lenticulations 68.

In such an embodiment as shown in FIG. 4, the lenticulations may be protected as illustrated in FIG. 5. A protective coating 71 is applied over the lenticulations 68a. This coating is transparent and forms an effective hermetic seal over the lenticulations. The coating prevents evaporation, or physical or chemical change of the lenticulations which may result from heat generated in the operation of the tube. It also protects the lenticulations from any residual bombardment by electrons. It will be understood that such a coating also may be used with the tube 64 of FIG. 3. In both types of tubes 64 of FIG. 3 and 64a of FIG. 4, such a coating provides the lenticulations with mechanical and/or abrasion protection. It also serves to minimize surface reflections from the viewing side of the lenticulations, as well as to provide an effective optical transition between the lenticulations, the substrate and the luminescent screen.

Figure 6:
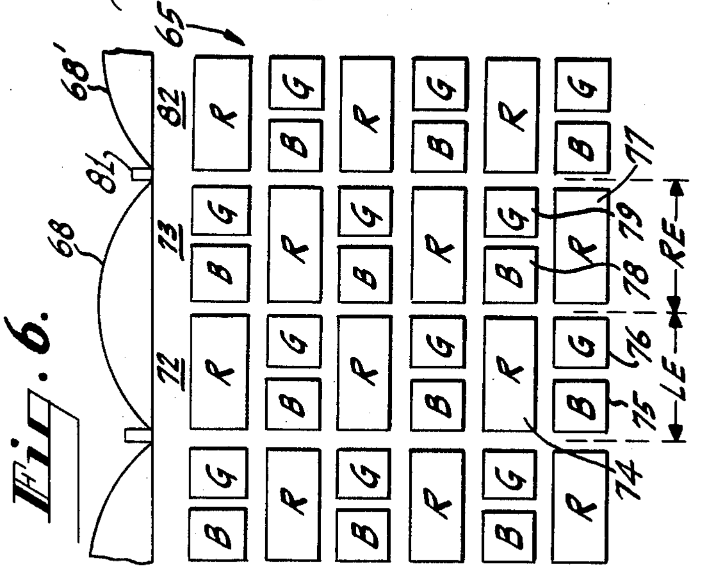
FIG. 6 shows one arrangement of the color-reproducing luminescent components of an image-reproducing cathode ray tube in accordance with a feature of the invention.

FIG. 6 illustrates one arrangement of the luminescent components of the screen 65 of either of the three-dimensional color image reproducing devices respectively shown generally in FIGS. 3 and 4. The components are arranged in pairs of vertical columns such as a left-eye column 72 and a right eye column 73. Each column of screen components comprises a multiplicity of triad groups, each of which includes a red luminescent component 74, a blue luminescent component 75, and a green luminescent component 76. In this particular arrangement, all of the components are rectangular and have substantially the same vertical dimensions. The blue and green components 75 and 76 are substantially square, having substantially the same horizontal dimensions. The red component 74, however, is elongated in the horizontal direction, having a horizontal dimension which is substantially double that of the blue and green components 75 and 76. In this way the red light output may be increased. In the left-eye column 72, the red component 74 in each group is above the blue and green components 75 and 76. In the right-eye column 73, however, the red component 77 is below the blue and green components 78 and 79. It is to be understood, however, that all of the groups in the left and right-eye columns 72 and 73 may be identical, if desired. In the particular arrangement shown, a relatively compact electron gun structure may be employed.

Also, in FIG. 6 the left and right-eye columns 72 and 73 of luminescent screen components are shown in their respective positions relative to the lenticulation 68 associated with them. The lenticulations, such as 68 and 68′ may be separated by a small opaque strip 81 which effectively prevents an observer from viewing an adjacent column 82 of luminescent screen components through the lenticulation 68. It should be noted that the phosphor arrangements or groupings and placements in FIG. 6 are substantially similar to and compatible with those of the conventional shadow mask television display tube which is widely used in television receivers. Thus, the same general techniques may be employed to fabricate such a tube as those presently employed for the monocular color television picture tubes.

Figure 7:
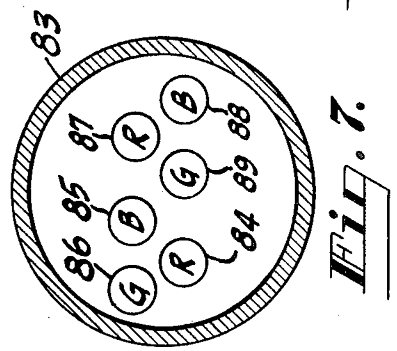
FIG. 7 is a representation of an electron gun arrangement for use in exciting the luminescent components of a cathode ray tube such as illustrated in FIG. 6.

In FIG. 7 there is shown an electron gun arrangement suitable for use with a screen having a pattern such as that shown in FIG. 6. An electron gun is provided for each of the screen components comprising a pair of left-eye and right-eye groups. The electron guns are housed within the neck portion 83 of the picture tube as is customary. The left-eye group includes red, blue and green guns 84, 85 and 86, respectively. Similarly, the right-eye group includes red, blue and green electron guns 87, 88 and 89, respectively. It will be noted that the relationship of the guns is reversed from that of the screen components which they excite. Such arrangements are those commonly found in color picture tubes of the shadow mask variety. The electron beams emanating from the respective guns effectively cross one another in traversing the apertures of the shadow mask.

Figures 8, 9, 10:
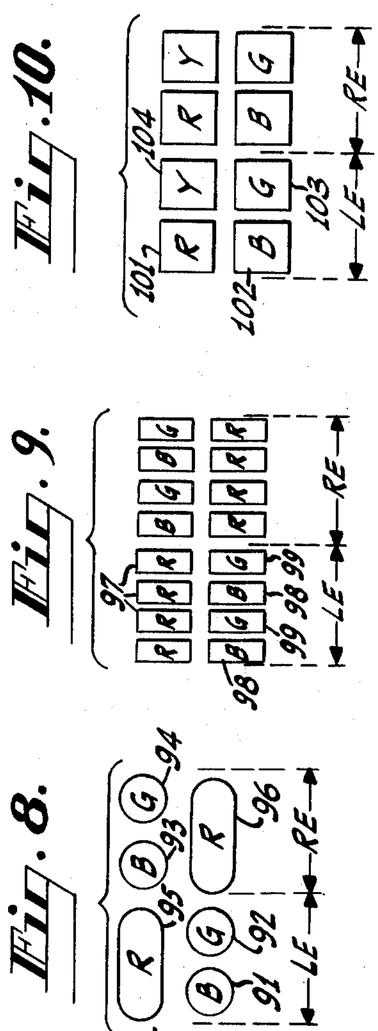
FIG. 8, 9, 10 and 11 show other arrangements of the luminescent screen components of a cathode ray picture tube in accordance with the invention.

FIG. 8 illustrates another triad arrangement of luminescent components of the picture tube screen. In this case, the blue and green components 91 and 92 of the left-eye column of components and the blue and green components 93 and 94 of the right-eye column of components are substantially circular. The red components 95 and 96 of the left-eye and right-eye columns of components are substantially elliptical, with the major axes thereof running horizontally so that, as in the arrangement of FIG, 6, the red components occupy areas which are approximately double the size of the areas occupied by the blue and green components. A screen of the character shown in FIG. 8 may be excited by an electron gun structure similar to that shown in FIG. 7.

FIG. 9 illustrates a quadrad arrangement of luminescent components by which to enable the reproduction of an image in somewhat greater detail than possible in either of the arrangements in FIG. 6 or FIG. 8. Each group of screen components includes four red components 87 and two each of blue and green components 88 and 89, respectively. Again, it is seen that the total area occupied by the red components is approximately twice that of the green and blue components. Such a screen arrangement may also be excited by an electron gun structure such as that shown in FIG. 7.

In FIG. 10 another quadrad arrangement of the screen components is shown for four color image reproduction. The left-eye groups of luminescent components comprise red, blue, green and yellow square areas 101, 102, 103 and 104, respectively. A similar arrangement of the luminescent components of the screen is made for the right-eye groups. In order to excite one of the groups of luminescent screen components, four electron guns are required. They may be arranged in two groups, for example, similarly to the arrangement shown in FIG. 7, it being understood that, instead of having three guns in each group as in FIG. 7, four guns will be required. Such an arrangement enables the simultaneous excitation of both the left-eye and right-eye component groups.

Figures 11, 12, 13, 14, 15:
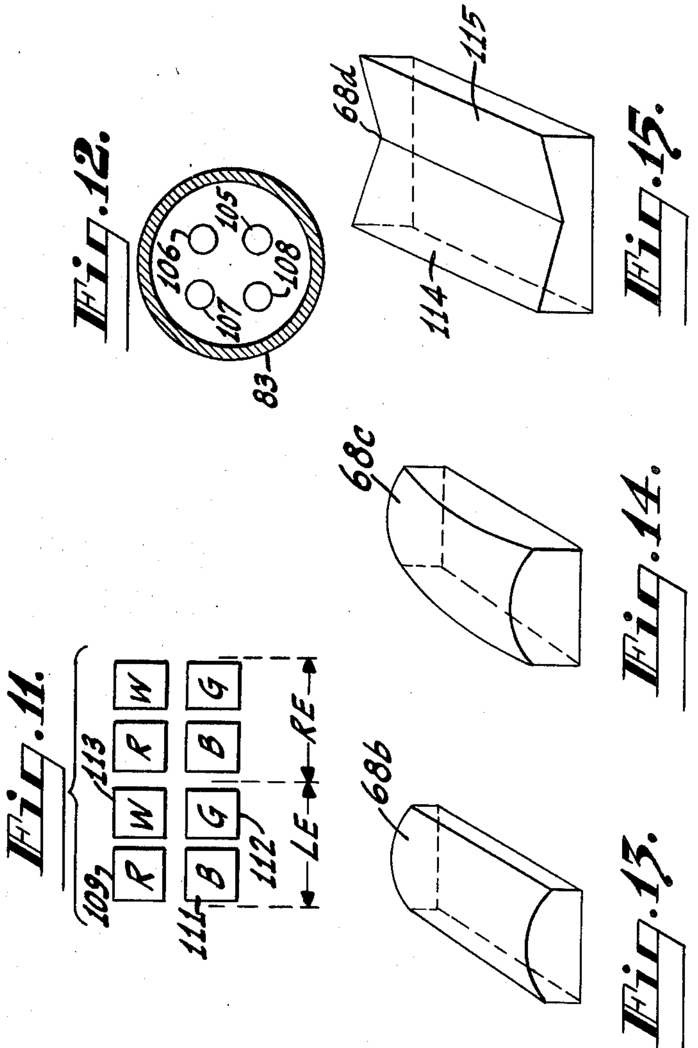
FIG. 12 illustrates another electron gun arrangement particularly suited for operation with the screen arrangements of FIGS. 10 and 11.
FIGS. 13, 14 and 15 are illustrations of typical forms of lenticulations provided on a cathode ray picture tube in accordance with the invention.

Alternatively, a single group of four electron guns may be used to excite the left and right-eye groups in alternation. Such a gun structure is illustrated in FIG. 12 in which the electron guns 105, 106, 107 and 108, respectively, excite the red, blue, green and yellow components 101, 102, 103 and 104. Again, it will be noted that the electron gun arrangement of FIG. 12 relative to the luminescent screen components of FIG. 10, is based upon the use of a shadow mask type of image reproducing device in which the electron beams from the four guns effectively cross one another as they traverse the apertures of the shadow mask.

Still another quadrad arrangement of the luminescent components of the cathode ray tube screen is shown in FIG. 11. This arrangement also is one in which the components have substantially square configurations. In this arrangement, the respective components 109, 111, 112 and 113, produce red, blue, green and white light. It will be understood that, as used herein and in the claims, white is considered as one of the image colors. The luminescent components of such an arrangement may be excited by an electron gun structure such as that shown in FIG. 12 or by one similar to that shown in FIG. 7, modified to include four guns in each group as previously described. In either case, the electron gun 108 of FIG. 12, or its counterparts in a modified FIG. 7 arrangement, preferably will be energized by video signals having a relatively wide frequency band and representing the luminescent components of the reproduced image. By such means, a high resolution black and white image in both left-eye and right-eye versions is made by means of the luminescent screen components such as the component 113 of FIG. 11 and its associated electron gun 108 of FIG. 12.

FIG. 13 illustrates one form of lenticulation through which the luminescent screen may be viewed. In this case, the lenticule 68*b* has a substantially cylindrical surface with the long dimension extending vertically relative to the screen. Such a lenticulation may also be somewhat acylindrical if desired for better control of the horizontal separation of the left-eye and right-eye light beams, respectively.

Another form of one of the elements of the lenticular face plate is shown in FIG. 14. The lenticule 68*c* does not extend substantially over the entire length of a pair of vertical screen columns as does the lenticule of 68*b* of FIG. 13, but is arranged in a vertical column along with a number of similar lenticules, thereby forming a lenticular column in registery with each of the pairs of luminescent screen component columns. Again, the lenticule 68*c* may, if desired, have a somewhat aspherical configuration to improve left-eye and right-eye light beam separation.

Still another form of lenticulation which may be used for stereoscopic viewing of the luminescent screen is shown in FIG. 15. In this case, each lenticulation 68*d* comprises two prismatic sections 114 and 115 extending vertically in front of each pair of left-eye and right-eye columns of luminescent screen components.

Figure 16:
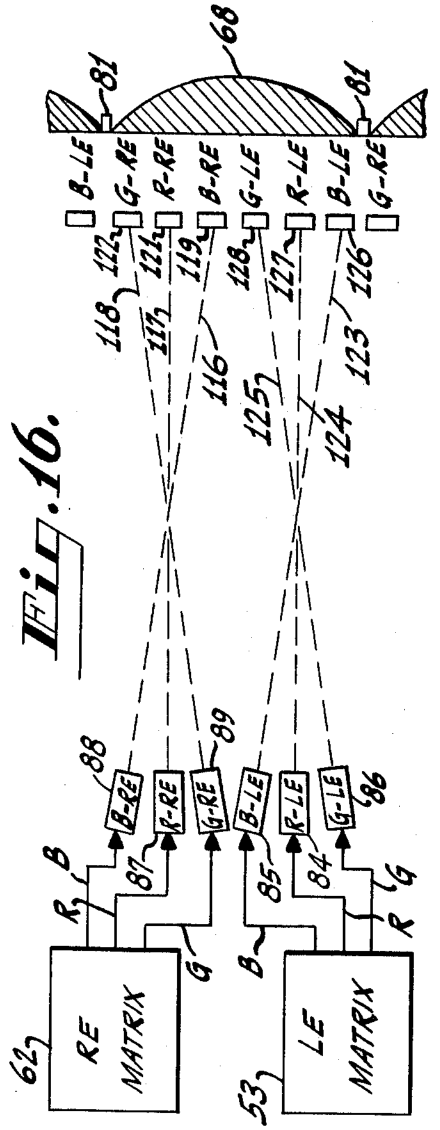
FIG. 16 is a diagrammatic representation of an energizing circuit arrangement embodying a feature of the invention for use with a picture tube having an electron gun structure such as that shown in FIG. 7 and a screen pattern such as that indicated in any of FIGS. 6, 8 and 9.

FIG. 16 indicates generally the manner in which an electron gun structure such as that shown in FIG. 7 is energized to simultaneously excite a group of luminescent screen components in each of a pair of left-eye and right-eye columns. The blue, red and green video signals derived from the RE matrix 62 of FIG. 3 and representing right-eye information are applied respectively, to the blue, red and green electron guns 88, 87 and 89 of the gun arrangement shown in FIG. 7. Similarly, the blue, red and green video signals derived from the LE matrix 53 of FIG. 3 and representing left-eye information are concurrently impressed upon the blue, red and green electron guns 85, 84 and 86. As indicated in FIG. 16, the electron beams 116, 117 and 118 emanating, respectively, from the blue, red and green electron guns 88, 87 and 89 excite the blue, red and green screen components 119, 121 and 122 of the right-eye column associated with the lenticule 68. Also, the electron beams 123, 124 and 125 emanating, respectively, from the blue, red and green electron guns 85, 84 and 86 excite the blue, red and green screen components 126, 127 and 128 of the left-eye column of screen components associated with the lenticule 68.

Figure 17:
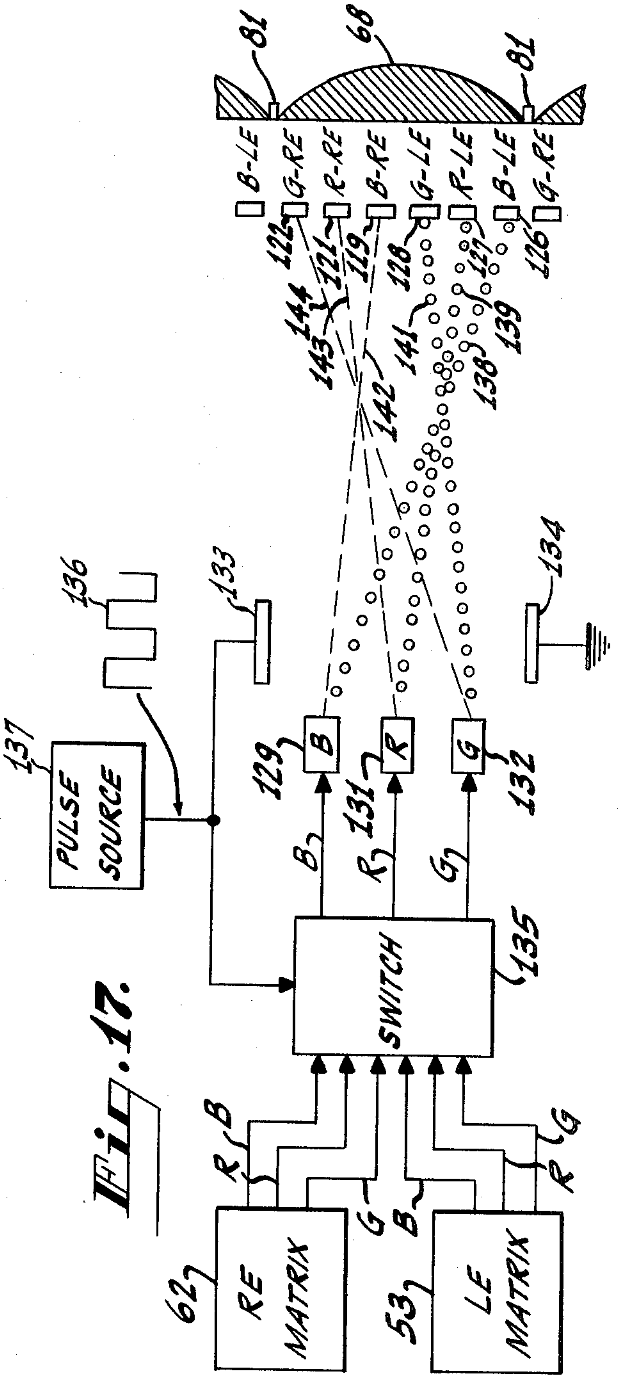
FIG. 17 is a diagrammatic representation of another type of energizing circuit arrangement in accordance with the invention for use with a picture tube having a single electron gun structure to excite both left-eye and right-eye image-producing screen elements.

In FIG. 17, one way of exciting the left and right-eye groups of luminescent screen components alternately by means of a single set of electron guns is diagrammatically indicated. In this case, the cathode ray image reproducing tube includes blue, red and green electron guns 129, 131 and 132. The tube also includes an auxiliary beam deflection means such as a pair of deflection plates 133 and 134. The left and right-eye color representative signals derived respectively from the LE and RE matrices 53 and 62 are applied to an electronic switch 135. This switch is actuated under the control of a series of pulses 136 derived from a pulse source 137 to alternately connect first the right-eye and then the left-eye information signals derived from the RE and LE matrices 62 and 53 to the electron guns 129, 131 and 132. The pulses 136 also are applied to the auxiliary deflection plates 133 and 134 to deflect the electron beams from one column of screen components to another.

Assume that left-eye information is applied by the switch 135 to the electron guns 129, 131 and 132. By means of the described energization of the deflection plates 133 and 134 by the pulses 136, the blue, red and green electron beams, respectively, traverse paths 138, 139 and 141, thereby exciting the blue, red and green luminescent screen components 126, 127 and 128. In the succeeding instant, the switch 135 applies right-eye information to the electron guns 129, 131 and 132 and the deflection plates 133 and 134 are energized by the pulses 136 to deflect the electron beams from the blue, red and green guns 129, 131 and 132 along paths 142, 143 and 144. The right-eye group of blue, red and green screen components 119, 121 and 122 thus are excited by the right-eye information.

The present invention is susceptible of embodiment in a system in which the subject is in the form of a record such as a photographic film. FIG. 18 illustrates a portion of a motion picture film 145 in which a left-eye image 146 and a right-eye image 147 occupy juxtaposed areas of the same frame 148. In order to record both of the images 146 and 147 in the same film frame (which has a substantially 4-to-3 horizontal-to-vertical aspect ratio) each of the images is anamorphosed horizontally with a 2-to-1 compression to a 2-to-3 aspect ratio.

FIG. 19 shows diagrammatically an illustrative embodiment of the invention utilizing a film record 145 such as that shown in FIG. 18 representing a three-dimensional color television subject. The film 145 is run through a projector (not shown) in the usual way. Light from a source 149 simultaneously illuminates the left-eye and right-eye images 146 and 147 respectively of the film 145. The light modulated by the film images follows respective paths 151 and 152 to left-eye and right-eye image de-anamorphosers 153 and 154. Each de-anamorphoser comprises an optical arrangement by which the modulates light image is converted from the recorded 2-to-3 horizontal-to-vertical aspect ratio to the normal 4-to-3 aspect ratio. The de-anamorphosed left-eye and right-eye images then are projected respectively along light paths **151*a* and 152*a* to the left-eye and right-eye optical systems 155 and 156 of a three-dimensional color television camera 157. In a manner similar to that described with reference to FIG. 1**, this camera produces red, green and blue signals representative of the left-eye and right-eye images for processing as previously described.

In the foregoing description of the three-dimensional signal transmitter of FIG. 1 reference was made to the desirability of processing the difference signal by means of a difference signal modifier **35*a* in order to compensate for certain anomalous optical effects and/or to achieve a desired psychophysical effect in the reproduced picture. In accordance with a feature of this invention the difference signal modifier 35*a*** may have any one of a number of different forms.

In FIG. 20 the difference signal modifier **35*a* is in the form of a phase control 158 by means of which the difference signal may be advanced or effectively retarded in time and thus may be combined in the difference circuit 61 of FIG. 3** earlier or later with the signal which is transmitted and received in its full frequency range.

In FIG. 21 the difference signal modifier **35*a* is in the form of an amplitude control 159** by means of which the difference signal may be increased or decreased from its original magnitude.

In FIG. 22 the difference signal modifier **35*a* is in the form of a linearity control 161 by means of which the difference signal may be linearized or non-linearized in its amplitude-versus-time aspect. Any non-linearization of the difference signal by the linearity control 161** may be in its time aspect only or in its amplitude aspect only or in a selected combination of both its time and amplitude aspects.

In FIG. 23 the difference signal modifier **35*a* is in the form of a combination of the phase control 158 of FIG. 20 and the amplitude control 159 of FIG. 21** so that the difference signal may be modified in both phase and amplitude as previously described.

In FIG. 24 the difference signal modifier **35*a* is in the form of a combination of the phase control 158 of FIG. 20 and the linearity control 161 of FIG. 22** so that the difference signal may be modified in both phase and linearity as previously described.

In FIG. 25 the difference signal modifier **35*a* is in the form of a combination of the amplitude control 159 of FIG. 21 and the linearity control 161 of FIG. 22** so that the difference signal may be modified in both amplitude and linearity as previously described.

In FIG. 26 the difference signal modifier **35*a* is in the form of a combination of the phase control 158 of FIG. 20, the amplitude control 159 of FIG. 21 and the linearity control 161 of FIG. 22** so that the difference signal may be modified in phase, amplitude and linearity as previously described. Each of the difference-signal modifiers may be so designed electrically as to control only its own correspondingly-controlled parameter(s) but not markedly to affect the values of the parameter(s) controlled by other and therewith associated difference-signal modifiers.

As is known in the art the difference signal modifier **35*a*** may comprise a single amplifier suitably designed so that all three of the difference signal properties including phase, amplitude and linearity may be controlled either singly or in any of the above-described combinations of these properties. Such control may be effected manually or, in appropriate instances, may be effected at least partially by semi-automatic means. For example, a wave of suitable amplitude and form, such as sinusoidal or sawtooth, may be synchronized with the scanning apparatus and applied to the amplitude and/or phase controlling facilities of the amplifier in order to affect a desired linearization control of the difference signal. The character of any linearization control of the difference signal (e.g., non-linearization of the signal) may be varied to compensate for a particular anomalous effect or to produce a desired psychophysical effect in the reproduced picture. As one example, the linearization control of the difference signal may be such as to non-linearize the signal based on its amplitude in which case the degree of non-linearization may be held constant during one picture field or frame. As another example, the degree of any difference signal non-linearization may be varied as a function of time so that, for instance, it is a maximum at, or near, the beginning and/or end of a selected scanning interval such as a line, a field or a frame of the picture.

It will be understood that the present invention also is susceptible of use with other types of records such as magnetic tape for three-dimensional subjects.

It may be seen from the foregoing description of a number of illustrative embodiments of the various aspects of the invention that the system meets all of the requirements of an acceptable and practical system of stereoscopic color television. Among the primary attributes of the system are the following.

Viewers are not required to wear glasses of any kind, nor to use other visual aids in order to observe the stereoscopic effects.

The system is fully and automatically compatible with existing television systems. It is susceptible of either monochrome or color operation as well as either monocular or stereoscopic operation, or for any combination of such modes of operation.

The receiver and image reproducing device automatically processes the signals and appropriately and, if desired, automatically reproduces pictures for all four of the operational modes of the system: viz., monochrome monocular; monochrome stereoscopic; color monocular; and color stereoscopic.

Pictures are of acceptable quality characterized by image sharpness; adequate brightness; color fidelity; uniformity of image luminance and sharpness toward the edges of the picture; and an absence of flicker, crawl and annoying image structure. The technical methods of securing these necessary characteristics are available and are clearly within the present state of the art and, hence, need not be repeated herein.

The viewing angle within which observers may view the picture with stereoscopic effects, and the corresponding viewing area within which such observers may be seated, conform to the average home room dimensions and customary viewing distances.

Some secondary attributes of the disclosed three-dimensional color television system embodying the invention include the following.

The system is capable of readily utilizing specially prepared monochrome or color film or magnetic type recordings for transmission. Each pair of left-eye and right-eye images, for example, may be anamorphosed with a 2-to-1 horizontal compression and placed side by side on a single frame of motion picture film. When such film is scanned for video signal generation, it may be de-anamorphosed to restore the images to the conventional 4-by-3 aspect ratio.

The circuits, while necessarily greater in number than in monocular television transmitters and receivers, use conventional components and design and, hence, are readily constructed and perform their respective functions as reliably as in monocular television apparatus. It is recognized, however, that the picture tube, and its adjuncts, for a stereoscopic television system, such as that disclosed, necessarily is somewhat more complex than corresponding apparatus used in monocular color television receivers. Because of the necessary relationship between the columnar luminescent screen components and their associated lenticulations, the fabrication of a stereoscopic color picture tube must be precise and, hence, is likely to be more costly than a monocular color picture tube. The somewhat higher cost and complexity of three-dimensional color television is practically the result of a law of nature since such tri-dimensional color pictures in motion carry, and require, a somewhat greater amount of information than for any of the simpler and less impressive forms of monocular color television. But the realism and dramatic value of the tri-dimensional picture more than compensate for these added requirements.

What is claimed is:

1. A three-dimensional television system comprising:

means for developing first and second video signals respectively representative of two stereoscopically related images of a subject to be transmitted;

means responsive to said first and second video signals for producing a third video signal representing the difference between the higher frequency components of said first and second video signals, said third video signal being limited to a relatively narrow band of frequencies compared to the band of frequencies occupied by said first and second video signals;

means for transmitting to a receiver said third video signal and a selected one of said first and second video signals;

means at said receiver for combining said third video signal with said selected one of said first and second video signals in a manner to effectively recreate the non-selected one of said first and second video signals;

an image reproducing device operable to produce two horizontally interleaved images; and means for impressing said selected and effectively recreated non-selected ones of said first and second signals upon said image reproducing device to produce, respectively, said two interleaved images.

2. A three-dimensional television system as defined in claim 1 wherein:

said subject is a three-dimensional scene.

3. A three-dimensional television system as defined in claim 2 wherein:

said subject is a record having juxtaposed left-eye and right-eye representations of a three-dimensional scene.

4. A three-dimensional television system as defined in claim 3 wherein:

said record is a photographic film.

5. A three-dimensional television system as defined in claim 4 wherein:

said juxtaposed representations occupy two adjacent areas of each frame of said film.

6. A three-dimensional television system as defined in claim 5 wherein:

each of said juxtaposed representations is a two-to-one horizontally anamorphosed version of said scene.

7. In a three-dimensional television system for operation in a predetermined channel of the frequency spectrum, a transmitter comprising:

means for producing first and second complete video signals respectively representative of two stereoscopically related images of a subject and respectively having a relatively wide range of frequencies;

means responsive to said first and second video signals for producing a third video signal representing the difference between the higher frequency components of said first and second video signals, said third video signal being limited to a narrow band of frequencies relative to said first and second video signals; and means for transmitting a composite signal representative of said two stereoscopically related images, said composite signal comprising said third video signal and a selected one of said first and second video signals.

8. In a three-dimensional television system as defined in claim 7, wherein said transmitter includes:

means for limiting said third video signal to a relatively narrow band at one end of said relatively wide range of frequencies.

9. In a three-dimensional television system as defined in claim 8, wherein said transmitter includes:

means for shifting said third video signal to the other end of said relatively wide range of frequencies.

10. In a three-dimensional television system as defined in claim 9, wherein said transmitter includes:

means for reducing the amplitude of said third video signal.

11. In a three-dimensional television system as defined in claim 10, wherein said transmitter includes:

means for producing a picture carrier having a frequency adjacent one end of said channel;

means for modulating said picture carrier by said selected one of said first and second video signals to produce modulation products including a complete sideband and a vestigial sideband within said channel;

means for producing a difference signal carrier having a frequency within said channel; and means for modulating said difference signal carrier by said third video signal to produce modulation products including sidebands within said channel.

12. In a three-dimensional television system as defined in claim 11, wherein:

said difference signal carrier has a frequency within said vestigial sideband of said picture carrier.

13. In a three-dimensional television system as defined in claim 7, wherein said transmitter includes:

means for modifying the character of said third video signal.

14. In a three-dimensional television system as defined in claim 13, wherein said signal character-modifying means comprises:

means for altering said third video signal to modify its character in such a manner as to create a desired psychophysical effect in the picture reproduced by an image reproducing device.

15. In a three-dimensional television system as defined in claim 14, wherein said signal-altering means comprises:

means to compensate for certain anomalous effects including zone flattering, giantism and puppetry in the reproduced picture.

16. In a three-dimensional television system as defined in claim 15, wherein said compensating means comprises:

means for varying the phase of said third video signal.

17. In a three-dimensional television system as defined in claim 15, wherein said compensating means comprises:

means for varying the amplitude of said third video signal.

18. In a three-dimensional television system as defined in claim 15, wherein said compensating means comprises:

means for varying the linearity of said third video signal.

19. In a three-dimensional television system as defined in claim 18, wherein said linearity-varying means comprises:

means for varying the linearity of said third video signal in time.

20. In a three-dimensional television system as defined in claim 18, wherein said linearity-varying means comprises:

means for varying the linearity of said third video signal in amplitude.

21. In a three-dimensional television system as defined in claim 18, wherein said linearity-varying means comprises:

means for varying the linearity of said third video signal in both time and amplitude.

22. In a three-dimensional television system as defined in claim 15, wherein said compensating means comprises:

means for varying said third video signal in both phase and amplitude.

23. In a three-dimensional television system as defined in claim 15, wherein said compensating means comprises:

means for varying said third video signal in both phase and linearity.

24. In a three-dimensional television system as defined in claim 15, wherein said compensating means comprises:

means for varying said third video signal in both amplitude and linearity.

25. In a three-dimensional television system as defined in claim 15, wherein said compensating means comprises:

means for varying said third video signal in phase, amplitude and linearity.

26. In a three-dimensional television system in which there is transmitted in a predetermined channel of the frequency spectrum a composite signal including (1) a picture carrier with a complete sideband and a vestigial sideband produced by the modulation of said picture carrier by a selected one of first and second video signals respectively representative of two stereoscopically related images of a subject and respectively having a relatively wide range of frequencies, and (2) a difference signal carrier with modulation sidebands produced by a third video signal limited to a relatively narrow band of frequencies representative of the high frequency difference between said first and second video signals, a receiver comprising:

means for separately recovering said third video signal and said selected one of said first and second video signals;

means for combining said recovered third video signal with said recovered selected one of said first and second video signals in a manner to effectively recreate the non-selected one of said first and second video signals;

an image reproducing device operable to produce two horizontally interleaved images; and means for impressing said selected and effectively recreated non-selected ones of said first and second video signals upon said image reproducing device to produce, respectively, said two interleaved images.

27. In a three-dimensional television system as defined in claim 26, in which said third video signal is transmitted as a relatively narrow band of low frequencies, wherein said receiver includes:

means for shifting said recovered third video signal to a relatively narrow band of high frequencies corresponding to said high frequency difference between said first and second video signals.

28. In a three-dimensional television system as defined in claim 27, in which the modulation sidebands of said difference frequency carrier are transmitted at reduced amplitude, wherein said receiver includes:

means for enhancing the amplitude of said recovered third video signal before its combination with said selected one of said first and second video signals.

* * * * *